United States Patent
Zhang et al.

(10) Patent No.: US 11,916,637 B2
(45) Date of Patent: Feb. 27, 2024

(54) INDICATIONS OF SELECTED BEAMS FOR TRANSMISSION AND RECEPTION IN FULL DUPLEX OPERATION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/176,632

(22) Filed: Mar. 1, 2023

(65) Prior Publication Data
US 2023/0208500 A1 Jun. 29, 2023

Related U.S. Application Data

(62) Division of application No. 17/376,985, filed on Jul. 15, 2021, now Pat. No. 11,606,133.

(60) Provisional application No. 62/705,847, filed on Jul. 17, 2020.

(51) Int. Cl.
| | |
|---|---|
| *H04B 7/06* | (2006.01) |
| *H04W 72/044* | (2023.01) |
| *H04W 72/541* | (2023.01) |
| *H04L 5/14* | (2006.01) |

(52) U.S. Cl.
CPC ........ *H04B 7/0695* (2013.01); *H04W 72/046* (2013.01); *H04W 72/541* (2023.01); *H04L 5/14* (2013.01)

(58) Field of Classification Search
CPC ... H04B 7/0695; H04B 7/088; H04W 72/541; H04W 72/046; H04L 5/14
See application file for complete search history.

(56) References Cited

U.S. PATENT DOCUMENTS

| | | | |
|---|---|---|---|
| 11,606,133 B2 | 3/2023 | Zhang et al. | |
| 2019/0115955 A1* | 4/2019 | John Wilson | ......... H04L 5/0055 |
| 2020/0120584 A1 | 4/2020 | Yi et al. | |
| 2020/0145062 A1* | 5/2020 | Jung | ..................... H04W 48/20 |
| 2020/0220631 A1* | 7/2020 | Onggosanusi | ....... H04B 17/327 |
| 2021/0045149 A1* | 2/2021 | Davydov | .............. H04L 5/0044 |

(Continued)

FOREIGN PATENT DOCUMENTS

WO WO-2021202724 A1 * 10/2021 ........... H04B 7/0408

*Primary Examiner* — Sophia Vlahos
(74) *Attorney, Agent, or Firm* — Arun Swain

(57) ABSTRACT

Various aspects of the present disclosure generally relate to wireless communication. In some aspects, a first wireless communication device (WCD) may receive, from a second WCD, transmission configuration indicator (TCI) state information that defines a set of TCI state configurations for a full duplex operation, wherein TCI state configurations of the set of TCI state configurations are associated with respective receive beams and respective transmit beams. The WCD may transmit, to the second WCD, an indication of one or more candidate TCI states, associated with the set of TCI state configurations, for selection by the second WCD for communications using the full duplex operation. Numerous other aspects are provided.

15 Claims, 9 Drawing Sheets

(56) References Cited

U.S. PATENT DOCUMENTS

| | | | |
|---|---|---|---|
| 2021/0058999 A1* | 2/2021 | Chen | H04W 72/23 |
| 2021/0185647 A1 | 6/2021 | Rahman et al. | |
| 2021/0242922 A1* | 8/2021 | Koskela | H04W 72/53 |
| 2022/0015082 A1 | 1/2022 | Farag et al. | |
| 2022/0021436 A1 | 1/2022 | Zhang et al. | |
| 2022/0103325 A1 | 3/2022 | Chen | |
| 2022/0394504 A1* | 12/2022 | Guan | H04B 7/0691 |

* cited by examiner

INDICATIONS OF SELECTED BEAMS FOR TRANSMISSION AND RECEPTION IN FULL DUPLEX OPERATION

CROSS-REFERENCE TO RELATED APPLICATION

This application is a divisional of U.S. patent application Ser. No. 17/376,985, filed Jul. 15, 2021 (now U.S. Pat. No. 11,606,133), entitled "INDICATIONS OF SELECTED BEAMS FOR TRANSMISSION AND RECEPTION IN FULL DUPLEX OPERATION," which claims priority to U.S. Provisional Patent Application No. 62/705,847, filed on Jul. 17, 2020, entitled "INDICATIONS OF SELECTED BEAMS FOR TRANSMISSION AND RECEPTION IN FULL DUPLEX OPERATION," and assigned to the assignee hereof. The contents of both applications are incorporated herein by reference in their entireties.

FIELD OF THE DISCLOSURE

Aspects of the present disclosure generally relate to wireless communication and to techniques and apparatuses for indications of selected beams for transmission and reception in full duplex operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device (WCD) includes: receiving, from a second WCD, transmission configuration indicator (TCI) state information that defines a set of TCI state configurations for a full duplex operation, wherein TCI state configurations of the set of TCI state configurations are associated with respective receive beams and respective transmit beams; and transmitting, to the second WCD, an indication of one or more candidate TCI states, associated with the set of TCI state configurations, for selection by the second WCD for communications using the full duplex operation.

In some aspects, a method of wireless communication performed by a second WCD includes: transmitting, to a first WCD, TCI state information that defines a set of TCI state configurations for a full duplex operation, wherein TCI state configurations of the set of TCI state configurations are associated with respective receive beams and respective transmit beams; and receiving an indication of one or more candidate TCI states, associated with the set of TCI state configurations, for selection by the second WCD for communications using the full duplex operation.

In some aspects, a method of wireless communication performed by a first WCD includes: determining a configuration for one or more of a transmit beam or a receive beam for communicating with a second WCD; and transmitting, to the second WCD, an indication of one or more of a first reference associated with the transmit beam or a second reference associated with the receive beam.

In some aspects, a method of wireless communication performed by a second WCD includes: receiving, from a first WCD, an indication of one or more of a first reference associated with a configuration of a transmit beam of the first WCD or a second reference associated with a configuration of a receive beam of the first WCD; and storing one or more of the first reference associated with the configuration of the transmit beam of the first WCD or the second reference associated with the configuration of the receive beam of the first WCD.

In some aspects, a first WCD for wireless communication includes: a memory; and one or more processors coupled to the memory, the one or more processors configured to: receive, from a second WCD, TCI state information that defines a set of TCI state configurations for a full duplex operation, wherein TCI state configurations of the set of TCI state configurations are associated with respective receive beams and respective transmit beams; and transmit, to the second WCD, an indication of one or more candidate TCI states, associated with the set of TCI state configurations, for selection by the second WCD for communications using the full duplex operation.

In some aspects, a second WCD for wireless communication includes: a memory; and one or more processors coupled to the memory, the one or more processors configured to: transmit, to a first WCD, TCI state information that defines a set of TCI state configurations for a full duplex operation, wherein TCI state configurations of the set of TCI state configurations are associated with respective receive beams and respective transmit beams; and receive an indication of one or more candidate TCI states, associated with the set of TCI state configurations, for selection by the second WCD for communications using the full duplex operation.

In some aspects, a first WCD for wireless communication includes: a memory; and one or more processors coupled to the memory, the one or more processors configured to: determine a configuration for one or more of a transmit beam or a receive beam for communicating with a second WCD; and transmit, to the second WCD, an indication of one or more of a first reference associated with the transmit beam or a second reference associated with the receive beam.

In some aspects, a second WCD for wireless communication includes: a memory; and one or more processors coupled to the memory, the one or more processors configured to: receive, from a first WCD, an indication of one or more of a first reference associated with a configuration of a transmit beam of the first WCD or a second reference associated with a configuration of a receive beam of the first WCD; and store one or more of the first reference associated with the configuration of the transmit beam of the first WCD or the second reference associated with the configuration of the receive beam of the first WCD.

In some aspects, a non-transitory computer-readable medium storing a set of instructions for wireless communication includes: one or more instructions that, when executed by one or more processors of a first WCD, cause the first WCD to: receive, from a second WCD, TCI state information that defines a set of TCI state configurations for a full duplex operation, wherein TCI state configurations of the set of TCI state configurations are associated with respective receive beams and respective transmit beams; and transmit, to the second WCD, an indication of one or more candidate TCI states, associated with the set of TCI state configurations, for selection by the second WCD for communications using the full duplex operation.

In some aspects, a non-transitory computer-readable medium storing a set of instructions for wireless communication includes: one or more instructions that, when executed by one or more processors of a second WCD, cause the second WCD to: transmit, to a first WCD, TCI state information that defines a set of TCI state configurations for a full duplex operation, wherein TCI state configurations of the set of TCI state configurations are associated with respective receive beams and respective transmit beams; and receive an indication of one or more candidate TCI states, associated with the set of TCI state configurations, for selection by the second WCD for communications using the full duplex operation.

In some aspects, a non-transitory computer-readable medium storing a set of instructions for wireless communication includes: one or more instructions that, when executed by one or more processors of a first WCD, cause the first WCD to: determine a configuration for one or more of a transmit beam or a receive beam for communicating with a second WCD; and transmit, to the second WCD, an indication of one or more of a first reference associated with the transmit beam or a second reference associated with the receive beam.

In some aspects, a non-transitory computer-readable medium storing a set of instructions for wireless communication includes: one or more instructions that, when executed by one or more processors of a second WCD, cause the second WCD to: receive, from a first WCD, an indication of one or more of a first reference associated with a configuration of a transmit beam of the first WCD or a second reference associated with a configuration of a receive beam of the first WCD; and store one or more of the first reference associated with the configuration of the transmit beam of the first WCD or the second reference associated with the configuration of the receive beam of the first WCD.

In some aspects, an apparatus for wireless communication includes: means for receiving, from a second WCD, TCI state information that defines a set of TCI state configurations for a full duplex operation, wherein TCI state configurations of the set of TCI state configurations are associated with respective receive beams and respective transmit beams; and means for transmitting, to the second WCD, an indication of one or more candidate TCI states, associated with the set of TCI state configurations, for selection by the second WCD for communications using the full duplex operation.

In some aspects, an apparatus for wireless communication includes: means for transmitting, to a first WCD, TCI state information that defines a set of TCI state configurations for a full duplex operation, wherein TCI state configurations of the set of TCI state configurations are associated with respective receive beams and respective transmit beams; and means for receiving an indication of one or more candidate TCI states, associated with the set of TCI state configurations, for selection by the apparatus for communications using the full duplex operation.

In some aspects, an apparatus for wireless communication includes: means for determining a configuration for one or more of a transmit beam or a receive beam for communicating with a second WCD; and means for transmitting, to the second WCD, an indication of one or more of a first reference associated with the transmit beam or a second reference associated with the receive beam.

In some aspects, an apparatus for wireless communication includes: means for receiving, from a first WCD, an indication of one or more of a first reference associated with a configuration of a transmit beam of the first WCD or a second reference associated with a configuration of a receive beam of the first WCD; and means for storing one or more of the first reference associated with the configuration of the transmit beam of the first WCD or the second reference associated with the configuration of the receive beam of the first WCD.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
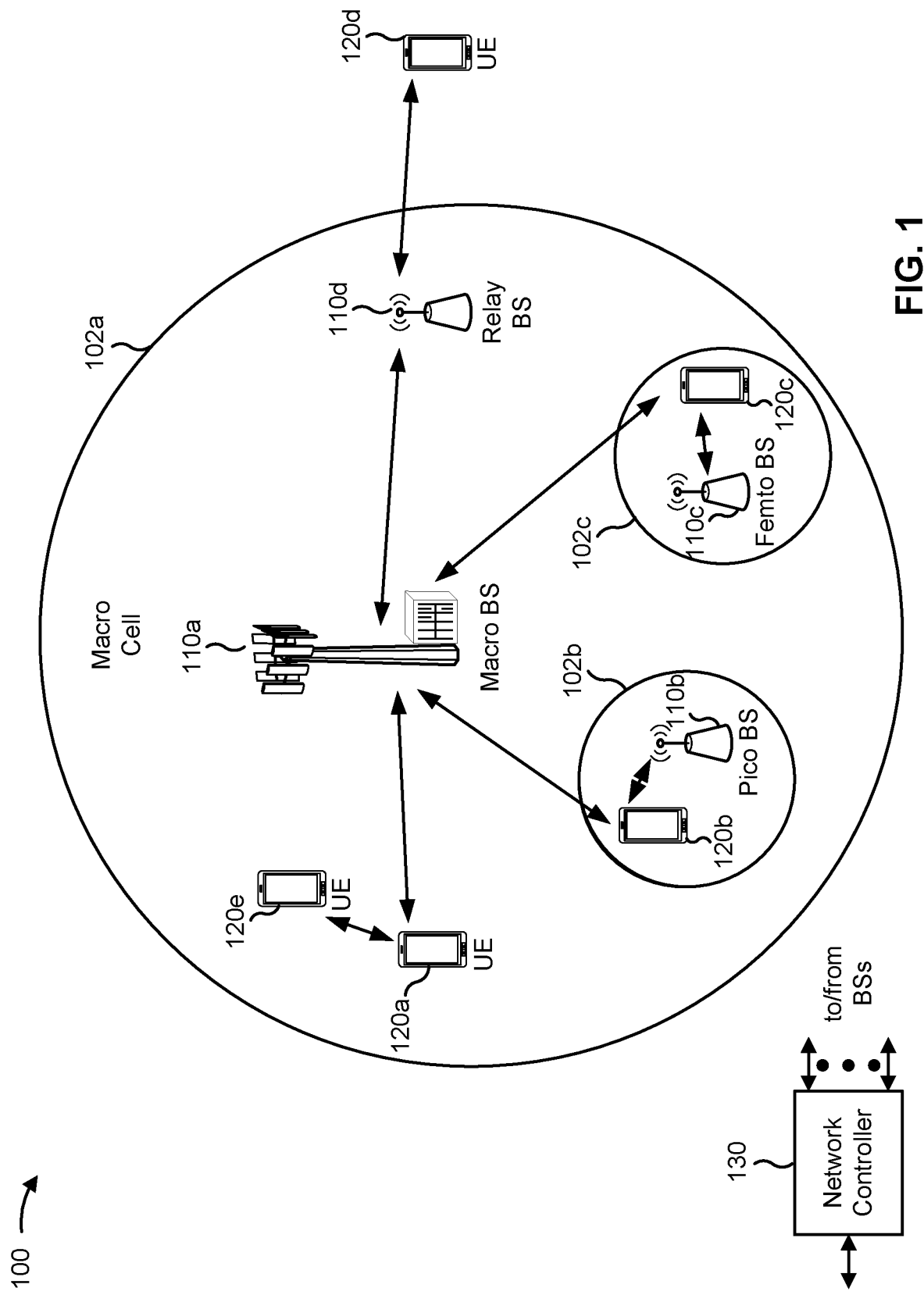
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
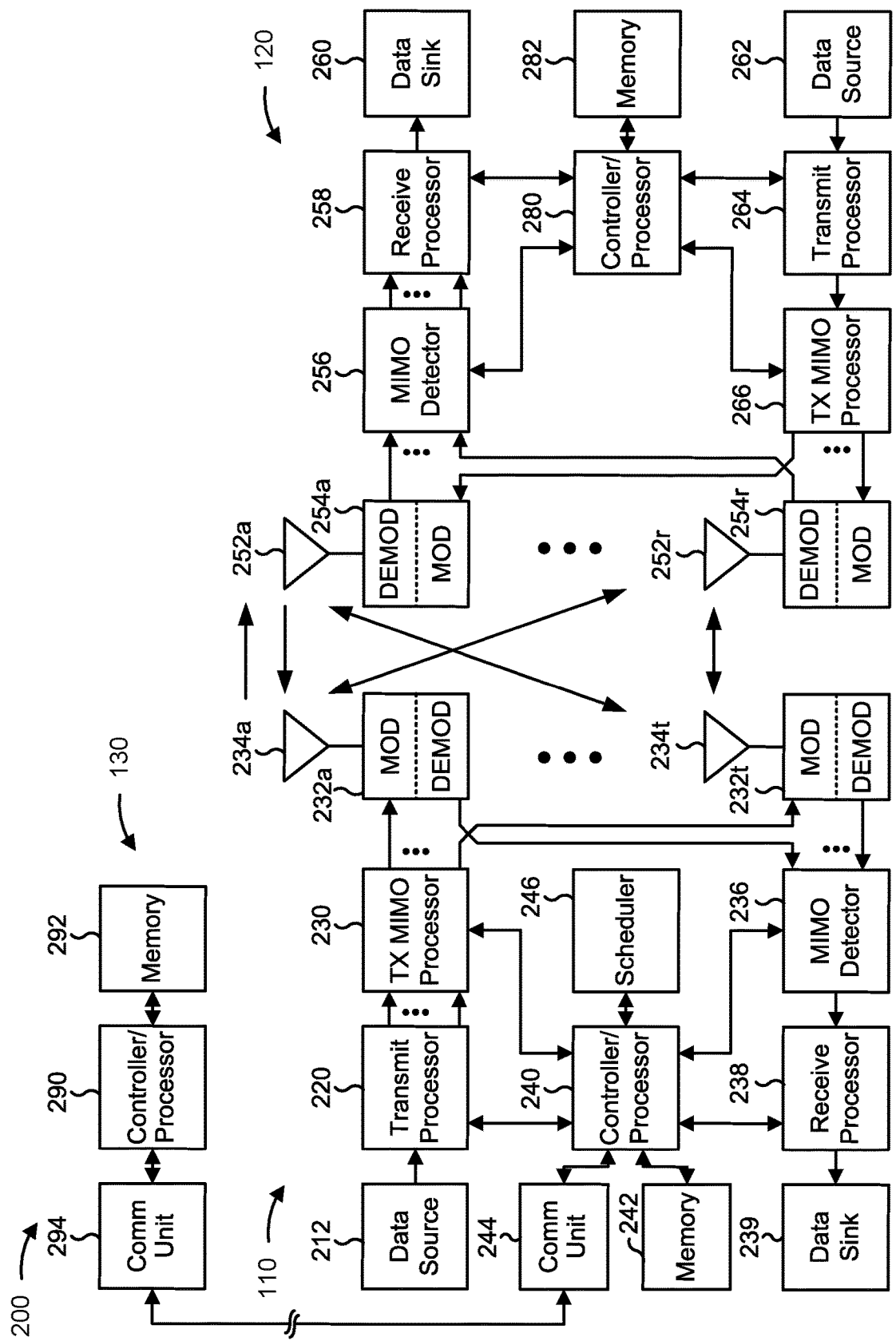
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to Tmodulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, (for example, as described with reference to FIGS. 4-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-9).

Controller/processor 240 of base station 110, controller/processor 280 of UE 120, and/or any other component(s) of FIG. 2 may perform one or more techniques associated with indications of selected beams for transmission and reception in full duplex operation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a first wireless communication device (e.g., UE 120, an integrated access and backhaul (IAB) node, and/or the like) may include means for receiving, from a second WCD, TCI state information that defines a set of TCI state configurations for a full duplex operation, wherein TCI state configurations of the set of TCI state configurations are associated with respective receive beams and respective transmit beams; means for transmitting, to the second WCD, an indication of one or more candidate TCI states, associated with the set of TCI state configurations, for selection by the second WCD for communications using the full duplex operation; and/or the like. In some aspects, the first WCD may include means for determining a configuration for one or more of a transmit beam or a receive beam for communicating with a second WCD; and means for transmitting, to the second WCD, an indication of one or more of a first reference associated with the transmit beam or a second reference associated with the receive beam; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a second WCD (e.g., base station 110, an IAB node, a parent node, a distributed unit, a central unit, and/or the like in an IAB network) may include means for transmitting, to a first WCD, TCI state information that indicates that the first WCD is to use a first beam to transmit communications and a second beam to receive communications in a full duplex operation; means for receiving one or more first communications via the first beam and transmitting one or more second communications via the second beam in the full duplex operation based at least in part on the TCI state information; and/or the like. In some aspects, the second WCD may include means for receiving, from a first WCD, an indication of one or more of a first reference associated with a configuration of a transmit beam of the first WCD or a second reference associated with a configuration of a receive beam of the first WCD; means for storing one or more of the first reference associated with the configuration of the transmit beam of the first WCD or the second reference associated with configuration of the receive beam of the first WCD; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
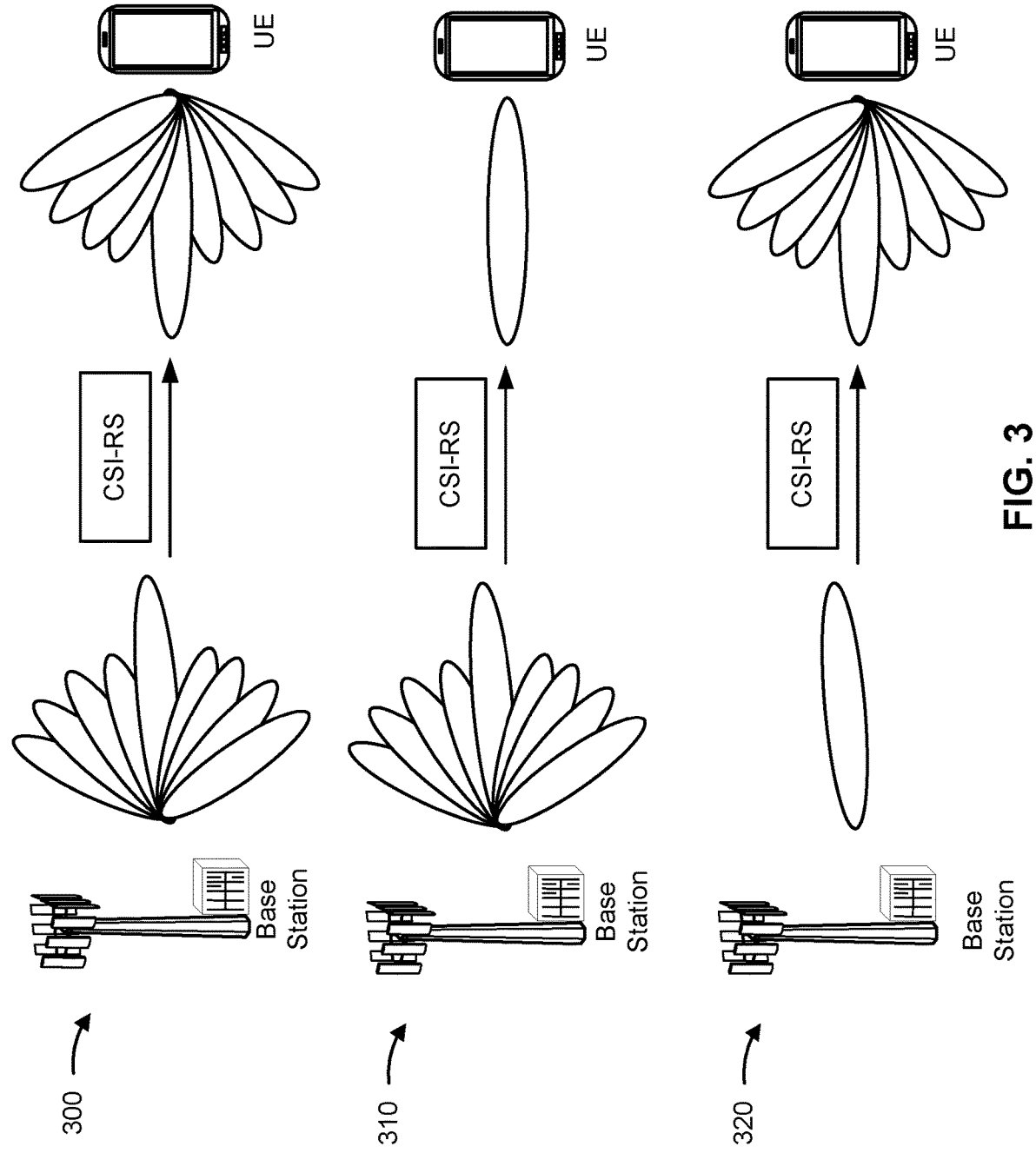
FIG. 3 is a diagram illustrating examples of channel state information reference signal beam management procedures, in accordance with various aspects of the present disclosure, in accordance with the present disclosure.

FIG. 3 is a diagram illustrating examples 300, 310, and 320 of channel state information (CSI) reference signal (CSI-RS) beam management procedures, in accordance with the present disclosure. As shown in FIG. 3, examples 300, 310, and 320 include a UE in communication with a base station in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an IAB child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 3, example 300 may include a base station 110 and a UE 120 communicating to perform beam management using CSI-RSs (e.g., non-zero power CSI-RSs (NZP-CSI-RSs). Example 300 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from the base station 110 to the UE 120. The CSI-RSs may be configured to be periodic (e.g., using RRC signaling and/or the like), semi-persistent (e.g., using medium access control (MAC) control element (MAC CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report (e.g., in a CSI report) the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) the CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE and the base station may perform the third beam management procedure before performing the second beam management procedure, the UE and the base station may perform a similar beam management procedure to select a UE transmit beam, and/or the like.

A TCI state information element (referred to as a TCI state herein) may indicate information associated with a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam. The TCI state and the spatial relation information provide information for only a downlink beam and an uplink beam, respectively.

Some UEs and/or base stations may support full duplex operation in which the UEs and/or the base stations support full duplex operations. For example, a UE may support transmission via a first beam (e.g., using a first antenna panel) and may simultaneously support reception via a second beam (e.g., using a second antenna panel). Support for simultaneous transmission and reception may be conditional on beam separation, such as spatial separation (e.g., using different beams), frequency separation, and/or the like. Additionally, or alternatively, support for simultaneous transmission may be conditional on using beamforming (e.g., in FR2, in frequency range 4 (FR4), for millimeter wave signals, and/or the like).

A base station may separately indicate a TCI state to maximize a downlink RSRP or signal-to-noise ratio (SNR) and spatial information to maximize uplink RSRP or SNR. However, in a full duplex operation, an uplink beam associated with the spatial relation information or UL TCI state may cause self-interference to a downlink beam associated with the TCI state. The self-interference may degrade performance of communication using the full duplex operation, which may cause communication errors and may consume computing, communication, network, and power resources to detect and/or recover from the communication errors, to communicate using lower MCSs, and/or the like.

In some aspects described herein, a first WCD (e.g., UE 120, an IAB node, and/or the like) may receive TCI state information that defines a set of TCI state configurations for a full duplex operation. TCI state configurations of the set of TCI state configurations may be associated with respective receive beams and respective transmit beams. In other words, the TCI state configurations may each identify a receive beam and a transmit beam in a single TCI state configuration.

The first WCD may select a subset of the TCI state configurations for measurements and determine one or more candidate TCI states, for selection by a second WCD (e.g., base station 110, an IAB node, a parent node, a distributed unit, a central unit, and/or the like in an IAB network). In some aspects, the first WCD may select the one or more candidate TCI states as part of a semi-autonomous selection of uplink and/or downlink beams for full duplex operation, clutter detection purpose, null forming purpose (e.g., to reduce side lobe interference), and/or the like.

The first WCD may select the one or more candidate TCI states based at least in part on signal-to-interference-plus-noise ratios (SINRs) (e.g., to maximize SINR, or to minimize self-interference). In some aspects, the first WCD may receive one or more reference signals (e.g., downlink reference signals) associated with downlink beams of the set of TCI state configurations and may transmit one or more uplink signals associated with uplink beams of the set of TCI state configurations. The first WCD may determine the SINR ratios based at least in part on the one or more reference signals and self-interference of the one or more uplink signals.

In some aspects, the second WCD may transmit the TCI state information by modifying TCI states that are configured (e.g., in Rel-15 or Rel-16 of the 3GPP) for downlink only, with an added transmission beam reference signal identification (e.g., an SRS-ResourceId). In some aspects, the second WCD may transmit the TCI state information by modifying TCI states that are configured (e.g., in Rel-15 or Rel-16 of the 3GPP) with two TCI state identifications (e.g., for self-interference measurement) in a codepoint of a DCI field (e.g., Transmission Configuration Indication) to include indications for TCI states, or a TCI state and spatial relation information, associated with an uplink direction and a downlink direction. In some aspects, the second WCD may transmit the TCI state information by defining a TCI state to include an indication of an uplink reference signal and an indication of a downlink reference signal.

Based at least in part on the first WCD receiving TCI state information that defines TCI configurations that are associated with respective receive beams and transmit beams, the first WCD and the second WCD may select a receive beam and a transmit beam that account for self-interference (e.g., with a high SINR) between the transmit beam and the receive beam. This may improve performance of full duplex operation, which may improve spectral efficiency and lower error rates, which may conserve computing, communication, network, and power resources. Additionally, or alternatively, this may conserve computing, communication, network, and/or power resources that may otherwise be consumed by signaling separate TCI state information and/or spatial relation information.

In some aspects described herein, a first WCD may receive partial partial configuration information, or no configuration information, associated with a transmit beam and/or a receive beam for communicating with a second WCD (e.g., in full duplex operation). In some aspects, the first WCD may not receive, or only receive a partial, configuration of the transmit beam and/or the receive beam from a second WCD. The first WCD may report a quality metric (e.g., RSRP, self-interference RSRP, and/or the like) on a resource (e.g., an autonomous self-interference measurement (SIM) resource) over which the first WCD has used a transmission beam and a reception beam. The first WCD may indicate a first reference associated with the transmit beam and/or a second reference associated with the receive beam so the base station may subsequently refer to the transmit beam and/or the receive beam (e.g., for beam management). For example, the base station may store the first reference and/or the second reference with an indication of the quality metric. The base station may refer to the transmit beam and/or the receive beam using the first reference and/or the second reference for subsequent processes and/or communications, such as full duplex communications, uplink and/or downlink beam management processes, and/or the like.

In some aspects, the first WCD may report an indication of the first reference and/or the second reference by modifying TCI states that are configured (e.g., in Rel-15 or Rel-16 of the 3GPP) for downlink only, with an added uplink reference signal identification (e.g., a Tx beam of a SIM-ResourceId). For example, a downlink beam may be configured by the second WCD, and the first WCD may select, configure, and indicate a reference for an uplink beam that the first WCD selects based at least in part on an SINR associated with the downlink beam and/or the uplink beam for full duplex operation.

In some aspects, the first WCD may report the indication of the first reference and/or the second reference by modifying spatial relation information that is configured (e.g., in Rel-15 or Rel-16 of the 3GPP) for uplink only, with an added downlink reference signal identification (e.g., an Rx beam of a SIM-ResourceId). For example, an uplink beam may be configured by the second WCD, and the first WCD may select, configure, and indicate a reference for a downlink beam that the first WCD selects based at least in part on an SINR associated with the downlink beam and/or the uplink beam for full duplex operation.

In some aspects, the first WCD may report the indication of the first reference and the second reference using a TCI state defined to include an indication of an uplink reference signal (e.g., a Tx beam of a SIM-ResourceId) and an indication of a downlink reference signal (e.g., an Rx beam of a SIM-ResourceId). In other words, the second WCD may transmit an indication of a combined uplink and downlink TCI state for full duplex operation.

In some aspects, the first WCD may report an indication of the first reference or the second reference by modifying TCI states that are configured (e.g., in Rel-15 or Rel-16 of the 3GPP) for downlink only, by replacing a current reference signal with a new downlink reference signal identification (e.g., an Rx beam of a Reference Signal ResourceId) for half duplex mode.

In some aspects, the first WCD may report the indication of the first reference or the second reference by modifying spatial relation information and/or UL TCI states that are configured (e.g., in Rel-15 or Rel-16 of the 3GPP) for uplink only, by replacing a current reference signal with a new uplink reference signal identification (e.g., a Tx beam of a Reference Signal ResourceId) for half duplex mode.

Based at least in part on the first WCD transmitting an indication of the first reference associated with the transmit beam and/or a second reference associated with the receive beam, the base station may subsequently refer to the transmit beam and/or the receive beam using the first reference and/or the second reference. This may allow the base station to refer to the transmit beam and/or the receive beam during a subsequent communication and/or process (e.g., beam management, communications, and/or the like). This may improve performance of full and/or half duplex operation, which may improve spectral efficiency and lower error rates, which may conserve computing, communication, network, and power resources. Additionally, or alternatively, this may conserve computing, communication, network, and/or power resources that may otherwise be consumed by signaling separate TCI state information and/or spatial relation information.

Figure 4:
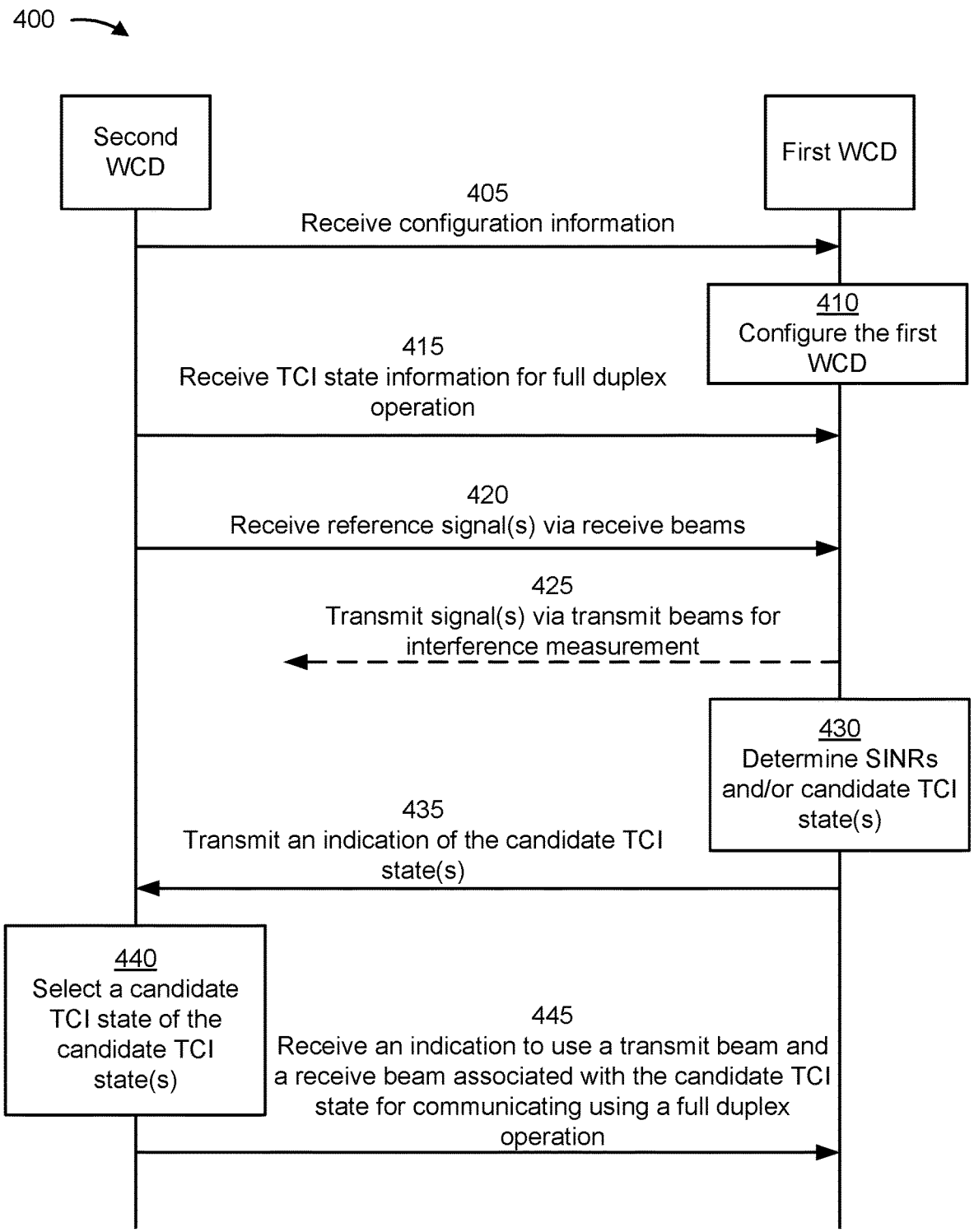
FIGS. 4 and 5 are diagrams illustrating examples associated with indications of selected beams for transmission and reception in full duplex operation, in accordance with the present disclosure.

FIG. 4 is a diagram illustrating an example 400 associated with beam direction selection for transmission and reception in full duplex operation, in accordance with the present disclosure. As shown in FIG. 4, a first WCD (e.g., UE 120, an IAB node, and/or the like) may communicate with a second WCD (e.g., base station 110, an IAB node, a parent node, a distributed unit, a central unit, and/or the like in an IAB network). The first WCD and the second WCD may be part of a wireless network (e.g., wireless network 100). In some aspects, the first WCD and the second WCD may be configured to communicate using millimeter wave signals, beamforming, a full duplex operation, and/or the like.

As shown by reference number 405, the second WCD may transmit, and the first WCD may receive, configuration information. In some aspects, the first WCD may receive the configuration information from another device (e.g., from another WCD and/or the like), from a specification of a communication standard, and/or the like. In some aspects, the first WCD may receive the configuration information via one or more of RRC signaling, MAC signaling (e.g., MAC CEs), and/or the like. In some aspects, the configuration information may include an indication of one or more configuration parameters (e.g., already known to the first WCD) for selection by the first WCD, explicit configuration information for the first WCD to use to configure the first WCD, and/or the like.

In some aspects, the configuration information may indicate that the first WCD is to perform one or more beam management procedures, such as a beam selection procedure, to select one or more beams for communicating with the second WCD. In some aspects, the configuration information may indicate that the first WCD is to provide, to the second WCD, an indication of one or more candidate TCI states and/or spatial relation information. In some aspects, the configuration information may indicate that the first WCD is to determine the one or more candidate TCI states and/or spatial relation information based at least in part on SINRs of reference signals associated with the one or more candidate TCI states and/or spatial relation information (e.g., transmitted or received via associated beams).

As shown by reference number 410, the first WCD may configure the first WCD for communicating with the second WCD. In some aspects, the first WCD may configure the first WCD based at least in part on the configuration information. In some aspects, the first WCD may be configured to perform one or more operations described herein.

As shown by reference number 415, the first WCD may receive, and the second WCD may transmit, TCI state information for a full duplex operation. In some aspects, the TCI state information defines a set of TCI state configurations for a full duplex operation. The TCI state configurations of the set of TCI state configurations may be associated with respective receive beams and respective transmit beams. In other words, the TCI state information may define TCI state configurations, at least some of which identify both of a receive beam and a transmit beam. In some aspects, the first WCD may receive the TCI state information via a DCI message, one or more MAC CEs, RRC signaling, and/or the like.

In some aspects, the TCI state configurations may be associated with the respective receive beams and the respective transmit beams based at least in part on the TCI state configurations indicating respective first reference signal identifications associated with the respective transmit beams and respective second reference signal identifications associated with the respective receive beams. In other words, a TCI state configuration may indicate a first reference signal identification that is associated with a transmit beam and a second reference signal identification that is associate with a receive beam to identify the transmit beam and the receive beam. In some aspects, the second reference signal may be associated with a reference signal type that is associate with receive beams (e.g., a CSI-RS, an SSB, and/or the like) and/or the first reference signal may be associated with a reference signal type that is associated with transmit beams (e.g., a sounding reference signal (SRS) and/or the like).

In some aspects, the TCI state configurations may be associated with the respective receive beams and the respective transmit beams based at least in part on respective single codepoints of DCI mapping to both of the respective receive beams and the respective transmit beams. In some aspects, the first WCD may receive configuration information to define the mapping of the single codepoint of the DCI to the respective receive beams and the respective transmit beams.

As shown by reference number 420, the first WCD may receive, and the second WCD may transmit, one or more reference signals via one or more receive beams. For example, the first WCD may receive the one or more reference signals via the respective receive beams. In some aspects, the first WCD may receive the one or more reference signals as part of a beam management process.

As shown by reference number 425, the first WCD may transmit one or more signals (e.g., uplink signals) via one or more transmit beams for interference measurement. For example, the first WCD may transmit the one or more signals via the one or more transmit beams to be measured to determine self-interference when receiving reference signals via receive beams.

As shown by reference number 430, the first WCD may determine SINRs and/or one or more candidate TCI states. In some aspects, the WCD may determine the SINRs and/or the one or more candidate TCI states based at least in part on receiving the one or more reference signals via the receive beams, transmitting the one or more signals via the transmit beams, and/or the like. In some aspects, the first WCD may determine an SINR for a candidate TCI state based at least in part on a measured signal strength of a reference signal received via a receive beam associated with the candidate TCI state and a measured self-interference of a signal (e.g., an uplink signal) transmitted by the first WCD via an associated transmit beam and received via the receive beam.

As shown by reference number 435, the first WCD may transmit, and the second WCD may receive, an indication of the one or more candidate TCI states for selection by the second WCD for communications using the full duplex operation. In some aspects, the first WCD may transmit the indication via an uplink control information (UCI) message, one or more MAC CEs, RRC signaling, and/or the like. In some aspects, the first WCD may indicate the one or more candidate TCI states based at least in part on a TCI state identification associated with a TCI state configuration defined by the TCI state information.

As shown by reference number 440, the second WCD may select a candidate TCI state of the one or more candidate TCI states. In some aspects, the second WCD may select the candidate TCI state based at least in part on the indication of the one or more candidate TCI states, scheduling constraints, and/or the like.

As shown by reference number 445, the first WCD may receive, and the second WCD may transmit, an indication to use a transmit beam and a receive beam associated with the candidate TCI state for communicating using a full duplex operation.

Based at least in part on the first WCD receiving TCI state information that defines TCI configurations that are associated with respective receive beams and transmit beams, the second WCD may select a receive beam and a transmit beam that account for self-interference between the transmit beam and the receive beam. This may improve performance of full duplex operation, which may improve spectral efficiency and lower error rates, which may conserve computing, communication, network, and power resources. Additionally, or alternatively, this may conserve computing, communication, network, and/or power resources that may otherwise be consumed by signaling separate TCI state information and/or spatial relation information.

As indicated above, FIG. 4 is provided as an example of a first WCD receiving TCI state information that defines TCI configurations that are associated with respective receive beams and transmit beams. Other examples may differ from what is described with respect to FIG. 4. For example, operations of the first WCD and/or the second WCD may be performed in a different order, example aspects may be combined in various combinations, and/or the like.

Figure 5:
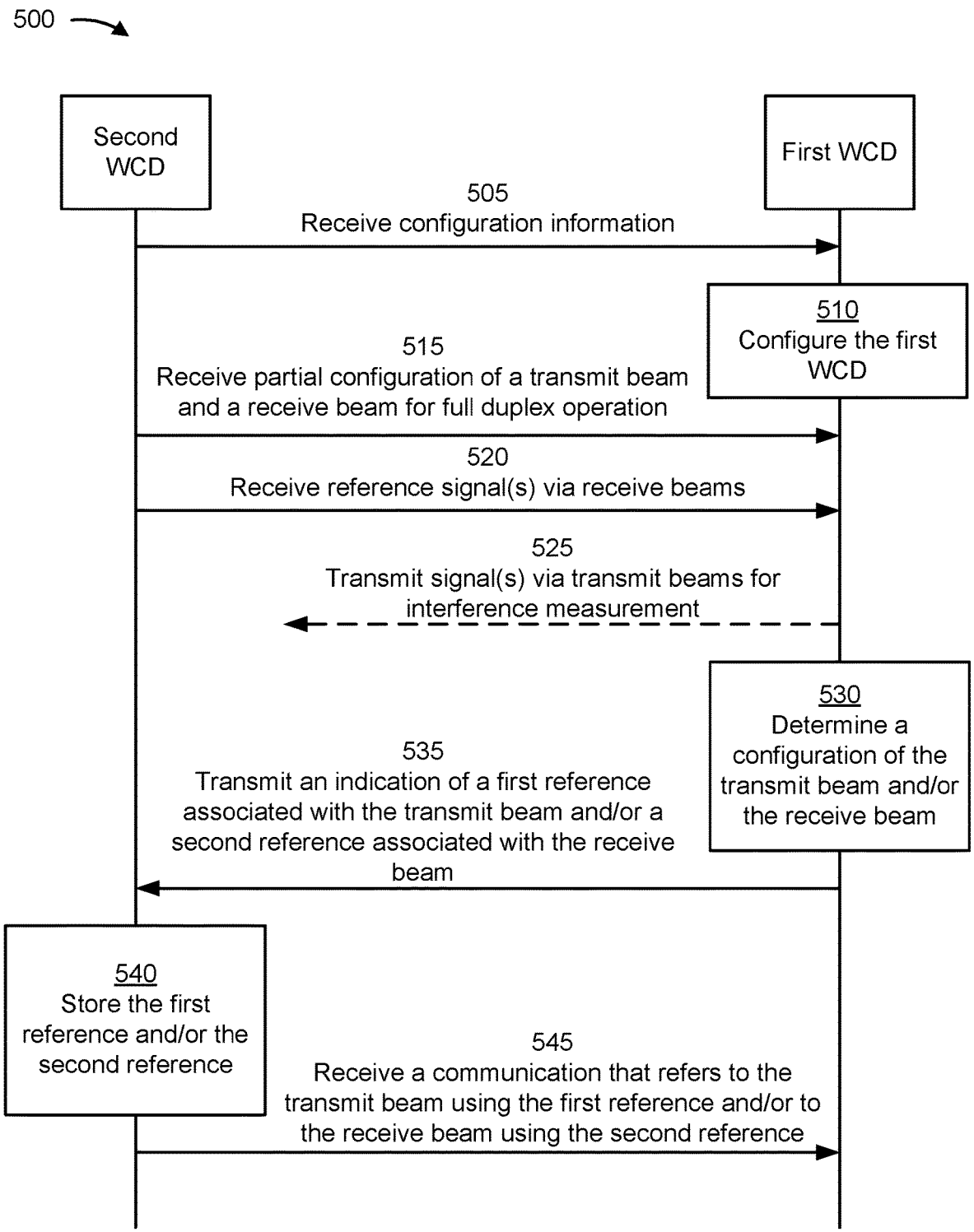

FIG. 5 is a diagram illustrating an example 500 associated with beam direction selection for transmission and reception in full duplex operation, in accordance with the present disclosure. As shown in FIG. 5, a first WCD (e.g., UE 120, an IAB node, and/or the like) may communicate with a second WCD (e.g., base station 110, an IAB node, a parent node, a distributed unit, a central unit, and/or the like in an IAB network). The first WCD and the second WCD may be part of a wireless network (e.g., wireless network 100). In some aspects, the first WCD and the second WCD may be configured to communicate using millimeter wave signals, beamforming, a full duplex operation, and/or the like.

As shown by reference number 505, the second WCD may transmit, and the first WCD may receive, configuration information. In some aspects, the first WCD may receive the configuration information from another device (e.g., from another WCD and/or the like), from a specification of a communication standard, and/or the like. In some aspects, the first WCD may receive the configuration information via one or more of RRC signaling, MAC signaling (e.g., MAC control elements (MAC CEs)), and/or the like. In some aspects, the configuration information may include an indication of one or more configuration parameters (e.g., already known to the first WCD) for selection by the first WCD, explicit configuration information for the first WCD to use to configure the first WCD, and/or the like.

In some aspects, the configuration information may indicate that the first WCD is to perform one or more beam management procedures, such as a beam selection procedure, to select one or more beams for communicating with the second WCD. In some aspects, the configuration information may indicate that the first WCD is to provide, to the second WCD, an indication of a first reference associated with a transmit beam and/or a second reference associated with a receive beam. In some aspects, the configuration information may indicate that the first WCD is to determine a configuration for the transmit beam and/or the receive beam for communicating with the second WCD. In some aspects, the configuration information may indicate a format and/or signaling type for transmitting the indication of the first reference and/or the second reference.

As shown by reference number 510, the first WCD may configure the first WCD for communicating with the second WCD. In some aspects, the first WCD may configure the first WCD based at least in part on the configuration information. In some aspects, the first WCD may be configured to perform one or more operations described herein.

As shown by reference number 515, the first WCD may receive, and the second WCD may transmit, a partial configuration of a transmit beam and a receive beam for full duplex operation. In other words, the configuration may not be fully configured by the second WCD. For example, the partial configuration may indicate one of the transmit beam or the receive beam, a set of candidate receive beams for selection by the first WCD, a set of candidate transmit beams for selection by the first WCD, and/or the like.

As shown by reference number 520, the first WCD may receive, and the second WCD may transmit, one or more reference signals via one or more receive beams. In some aspects (e.g., where the partial configuration configures the receive beam), the first WCD may receive the one or more reference signals via a configured receive beam as a reference for determining a transmit beam.

As shown by reference number 525, the first WCD may transmit one or more signals (e.g., uplink signals) via one or more transmit beams for interference measurement. For example, the first WCD may transmit the one or more signals via the one or more transmit beams to be measured to determine self-interference when receiving reference signals via receive beams. In some aspects (e.g., where the partial configuration configures the transmit beam), the first WCD may transmit the one or more signals via a configured transmit beam as a reference for determining a receive beam.

As shown by reference number 530, the first WCD may determine a configuration of the transmit beam and/or the receive beam. In some aspects, the first WCD may determine the configuration of the transmit beam and/or the receive beam based at least in part on the partial configuration. In some aspects, the first WCD may determine the configuration of the transmit beam and/or the receive beam independently from, or in absence of, the partial configuration.

In some aspects, the first WCD may determine the configuration for one or more of the transmit beam or the receive beam based at least in part on measurements of the one or more reference signals and the one or more uplink signals. In some aspects, the first WCD may determine the configuration for one or more of the transmit beam or the receive beam based at least in part on determined SINRs associated with the one or more receive beams. In some aspects, the first WCD may determine the SINRs associated with the one or more receive beams based at least in part on measured signal strengths of the one or more reference signals transmitted by the second WCD, and measured self-interference of the one or more signals transmitted by the first WCD.

As shown by reference number 535, the first WCD may transmit, and the second WCD may receive, an indication of the first reference associated with the transmit beam and/or a second reference associated with the receive beam. In some aspects, the first WCD may transmit the indication via a UCI message, one or more of MAC CEs, RRC signaling, and/or the like.

In some aspects, the first WCD may transmit the indication of the first reference and/or the second reference using an indication of a TCI state that indicates a first reference signal identification associated with the receive beam and a second reference signal identification associated with the transmit beam. In some aspects, the second reference signal identification is associated with a self-interference measurement resource identification. In some aspects, the second reference signal identification may be associated with a transmit reference signal (e.g., a type of reference signal that is associated with transmissions of the first WCD, such as an SRS).

In some aspects, the first WCD may transmit the indication of the first reference and/or the second reference using an indication of spatial relation information that indicates a first reference signal identification associated with the transmit beam and a second reference signal identification associated with the receive beam. In some aspects, the second reference signal identification is associated with a self-interference measurement resource identification. In some aspects, the first reference signal identification may be associated with a reception reference signal (e.g., a type of reference signal that is associated with receptions of the first WCD, such as a CSI-RS, an SSB, and/or the like).

In some aspects, the first WCD may transmit the indication of the first reference and/or the second reference using a combined indication of a downlink TCI state that indicates a first reference signal identification and uplink spatial relation information that indicates a second reference signal identification. In some aspects, the second reference signal identification is associated with a self-interference measurement resource identification. In some aspects, the first reference signal identification may be associated with a transmission reference signal and/or the second reference signal identification may be associated with a reception reference signal.

In some aspects, the first WCD may transmit the indication of the first reference using an indication of a TCI state that indicates a new reference signal identification associated with the receive beam, which may be associated with a self-interference measurement resource identification of a reference signal resource identification. In some aspects, the reference signal identification may be associated with a reception reference signal.

In some aspects, the first WCD may transmit the indication of the second reference using an indication of a spatial relation and/or uplink TCI state that indicates a new reference signal identification associated with the transmit beam, which may be associated with a self-interference measurement resource identification of a reference signal resource identification. In some aspects, the reference signal identification may be associated with a transmission reference signal.

As shown by reference number 540, the second WCD may store the first reference and/or the second reference. For example, the second WCD may store the first reference associated with the configuration of the transmit beam of the first WCD and/or the second reference associated with the configuration of the receive beam of the first WCD.

As shown by reference number 545, the first WCD may receive, and the second WCD may transmit, a communication that refers to the transmit beam using the first reference and/or to the receive beam using the second reference. For example, the second WCD may transmit an indication to perform full duplex communications, uplink and/or downlink beam management processes, and/or the like with reference to the transmit beam and/or the receive beam using the first reference and/or the second reference, respectively.

Based at least in part on the first WCD transmitting an indication of the first reference associated with the transmit beam and/or a second reference associated with the receive beam, after configuration by the first WCD, the base station may subsequently refer to the transmit beam and/or the receive beam. This may allow the base station to refer to the transmit beam and/or the receive beam during a subsequent communication and/or process. This may improve performance of full duplex operation, which may improve spectral efficiency and lower error rates, which may conserve computing, communication, network, and power resources. Additionally, or alternatively, this may conserve computing, communication, network, and/or power resources that may otherwise be consumed by signaling separate TCI state information and/or spatial relation information.

As indicated above, FIG. 5 is provided as an example of a first WCD transmitting references of configurations that are associated with a receive beam and a transmit beam configured by the first WCD. Other examples may differ from what is described with respect to FIG. 5. For example, operations of the first WCD and/or the second WCD may be performed in a different order, example aspects may be combined in various combinations, and/or the like.

Figure 6:
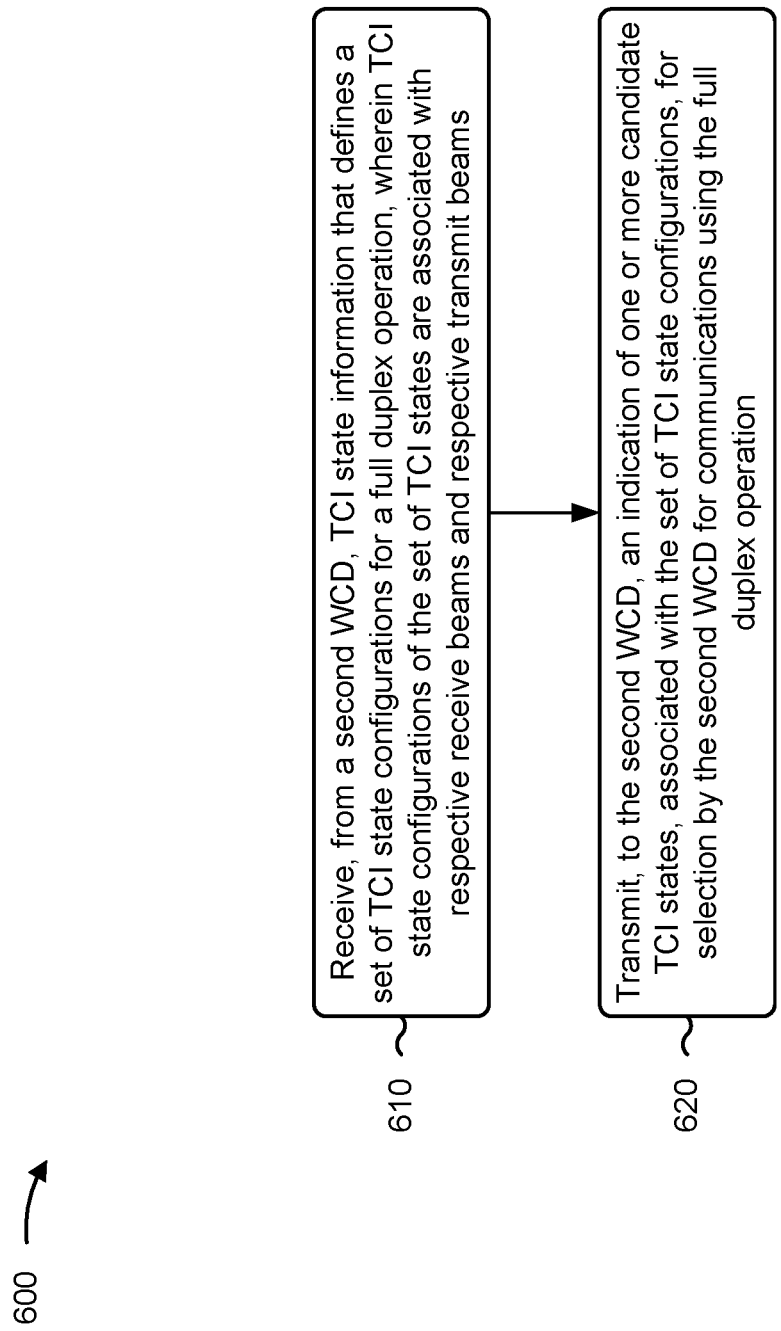
FIGS. 6-9 are diagrams illustrating example processes associated with indications of selected beams for transmission and reception in full duplex operation, in accordance with the present disclosure.

FIG. 6 is a diagram illustrating an example process 600 performed, for example, by a first WCD, in accordance with the present disclosure. Example process 600 is an example where the first WCD (e.g., UE 120, an IAB node, and/or the like) performs operations associated with indications of selected beams for transmission and reception in full duplex operation.

As shown in FIG. 6, in some aspects, process 600 may include receiving, from a second WCD, TCI state information that defines a set of TCI state configurations for a full duplex operation, wherein TCI state configurations of the set of TCI state configurations are associated with respective receive beams and respective transmit beams (block 610). For example, the first WCD (e.g., using antenna 252, DEMOD 254, MIMO detector 256, receive processor 258, controller/processor 280, and/or the like) may receive, from a second WCD, TCI state information that defines a set of TCI state configurations for a full duplex operation, wherein TCI state configurations of the set of TCI state configurations are associated with respective receive beams and respective transmit beams, as described above.

As further shown in FIG. 6, in some aspects, process 600 may include transmitting, to the second WCD, an indication of one or more candidate TCI states, associated with the set of TCI state configurations, for selection by the second WCD for communications using the full duplex operation (block 620). For example, the first WCD (e.g., using controller/processor 280, transmit processor 264, TX MIMO processor 266, MOD 254, antenna 252, and/or the like) may transmit, to the second WCD, an indication of one or more candidate TCI states, associated with the set of TCI state configurations, for selection by the second WCD for communications using the full duplex operation, as described above.

Process 600 may include additional aspects, such as any single aspect or any combination of aspects described below and/or in connection with one or more other processes described elsewhere herein.

In a first aspect, process 600 includes receiving one or more reference signals, transmitted by the second WCD, associated with the set of TCI state configurations via the respective receive beams, transmitting one or more uplink signals associated with the set of TCI state configurations via the respective transmit beams, and determining the one or more candidate TCI states based at least in part on measurements of the one or more reference signals and the one or more uplink signals.

In a second aspect, alone or in combination with the first aspect, process 600 includes determining, based at least in part on the measurements of the one or more reference signals and the one or more uplink signals, SINRs associated with the one or more candidate TCI states.

In a third aspect, alone or in combination with one or more of the first and second aspects, determining the SINRs associated with the one or more candidate TCI states includes determining the SINRs associated with the one or more candidate TCI states based at least in part on measuring signal strengths of the one or more reference signals transmitted by the second WCD, and measured self-interference of the one or more uplink signals transmitted by the first WCD.

In a fourth aspect, alone or in combination with one or more of the first through third aspects, the TCI state configurations are associated with the respective receive beams and the respective transmit beams based at least in part on the TCI state configurations indicating respective first reference signal identifications associated with the respective receive beams and respective second reference signal identifications associated with the respective transmit beams.

In a fifth aspect, alone or in combination with one or more of the first through fourth aspects, the respective second reference signal identifications are associated with transmit reference signals.

In a sixth aspect, alone or in combination with one or more of the first through fifth aspects, the TCI state configurations are associated with the respective receive beams and the respective transmit beams based at least in part on respective single codepoints of downlink control information mapping to the respective receive beams and the respective transmit beams.

In a seventh aspect, alone or in combination with one or more of the first through sixth aspects, receiving the TCI state information includes receiving the TCI state information via one or more of a downlink control information message, one or more medium-access-control control elements, or radio resource control signaling.

In an eighth aspect, alone or in combination with one or more of the first through seventh aspects, transmitting the indication of the one or more candidate TCI states includes transmitting the indication of the one or more candidate TCI states via one or more of an UCI message, one or more medium-access-control control elements, or radio resource control signaling.

In a ninth aspect, alone or in combination with one or more of the first through eighth aspects, process 600 includes receiving, from the second WCD, an indication to use a candidate TCI state, of the one or more candidate TCI states, for communicating with the second WCD via a receive beam and a transmit beam using the full duplex operation.

In a tenth aspect, alone or in combination with one or more of the first through ninth aspects, one or more of the first WCD includes one or more of a user equipment or an IAB node, or the second WCD includes one or more of a base station, an IAB node, a parent node in an IAB network, a distributed unit in an IAB network, or a central unit in an IAB network.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
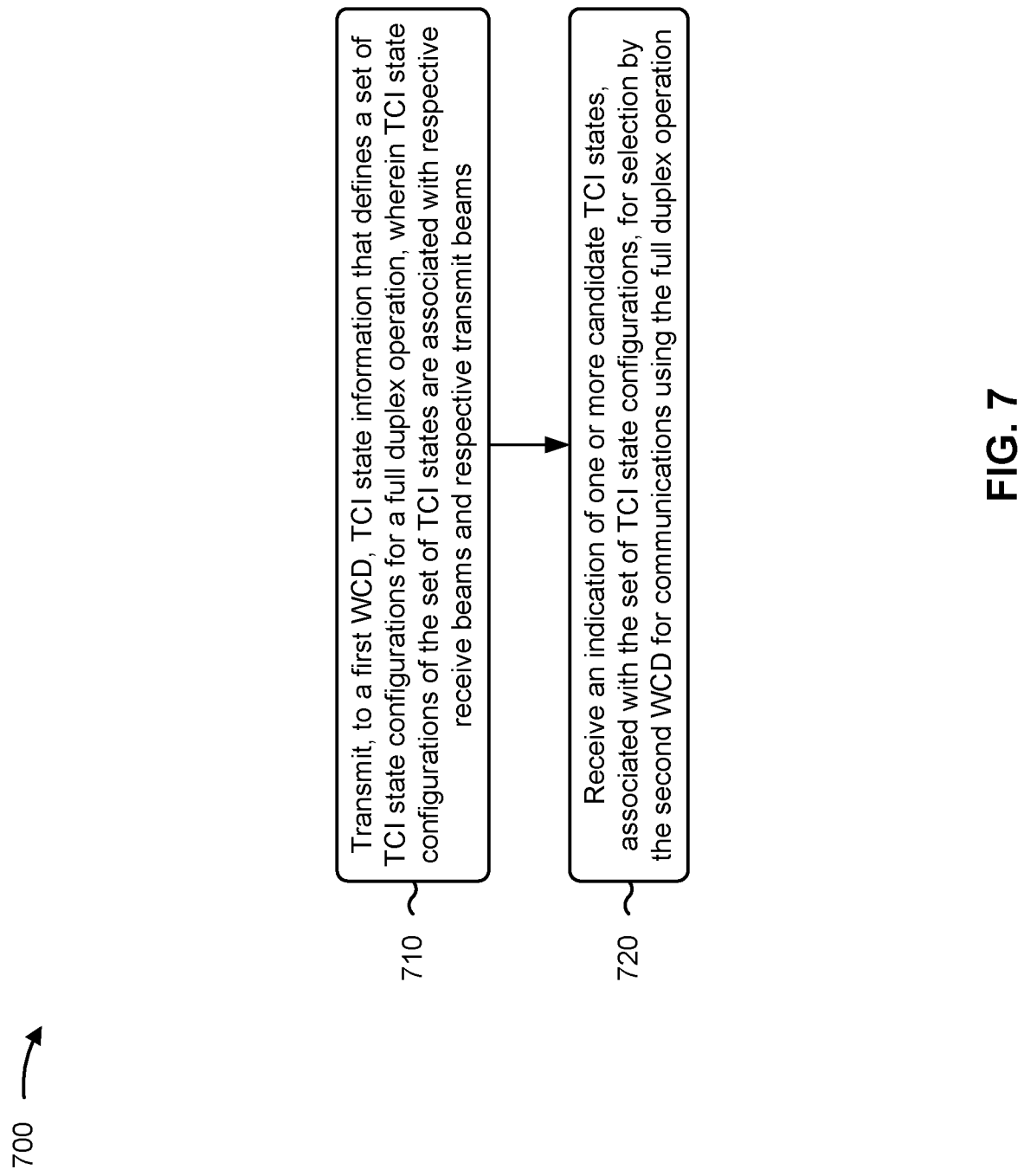

FIG. 7 is a diagram illustrating an example process 700 performed, for example, by a second WCD, in accordance with the present disclosure. Example process 700 is an example where the second WCD (e.g., base station 110, an IAB node, a parent node, a distributed unit, a central unit, and/or the like in an IAB network) performs operations associated with indications of selected beams for transmission and reception in full duplex operation.

As shown in FIG. 7, in some aspects, process 700 may include transmitting, to a first WCD, TCI state information that defines a set of TCI state configurations for a full duplex operation, wherein TCI state configurations of the set of TCI state configurations are associated with respective receive beams and respective transmit beams (block 710). For example, the second WCD (e.g., using controller/processor 240, transmit processor 220, TX MIMO processor 230, MOD 232, antenna 234, and/or the like) may transmit, to a first WCD, TCI state information that defines a set of TCI state configurations for a full duplex operation, wherein TCI state configurations of the set of TCI state configurations are associated with respective receive beams and respective transmit beams, as described above.

As further shown in FIG. 7, in some aspects, process 700 may include receiving an indication of one or more candidate TCI states, associated with the set of TCI state configurations, for selection by the second WCD for communications using the full duplex operation (block 720). For example, the second WCD (e.g., using antenna 252, DEMOD 254, MIMO detector 256, receive processor 258, controller/processor 280, and/or the like) may receive an indication of one or more candidate TCI states, associated with the set of TCI state configurations, for selection by the second WCD for communications using the full duplex operation, as described above.

Process 700 may include additional aspects, such as any single aspect or any combination of aspects described below and/or in connection with one or more other processes described elsewhere herein.

In a first aspect, process 700 includes transmitting, for reception by the first WCD via the respective receive beams, one or more reference signals associated with the set of TCI state configurations.

In a second aspect, alone or in combination with the first aspect, process 700 includes selecting a candidate TCI state of the one or more candidate TCI states based at least in part on the indication of the one or more candidate TCI states.

In a third aspect, alone or in combination with one or more of the first and second aspects, the TCI state configurations are associated with the respective receive beams and the respective transmit beams based at least in part on the TCI state configurations indicating respective first reference signal identifications associated with the respective receive beams and respective second reference signal identifications associated with the respective transmit beams.

In a fourth aspect, alone or in combination with one or more of the first through third aspects, the respective second reference signal identifications are associated with transmit reference signals.

In a fifth aspect, alone or in combination with one or more of the first through fourth aspects, the TCI state configurations are associated with the respective receive beams and the respective transmit beams based at least in part on respective single codepoints of downlink control information mapping to the respective receive beams and the respective transmit beams.

In a sixth aspect, alone or in combination with one or more of the first through fifth aspects, transmitting the TCI state information includes transmitting the TCI state information via one or more of a downlink control information message, one or more medium-access-control control elements, or radio resource control signaling.

In a seventh aspect, alone or in combination with one or more of the first through sixth aspects, receiving the indication of the one or more candidate TCI states includes receiving the indication of the one or more candidate TCI states via one or more of an UCI message, one or more medium-access-control control elements, or radio resource control signaling.

In an eighth aspect, alone or in combination with one or more of the first through seventh aspects, one or more of the first WCD includes one or more of a user equipment or an IAB node, or the second WCD includes one or more of a base station, an IAB node, a parent node in an IAB network, a distributed unit in an IAB network, or a central unit in an IAB network.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
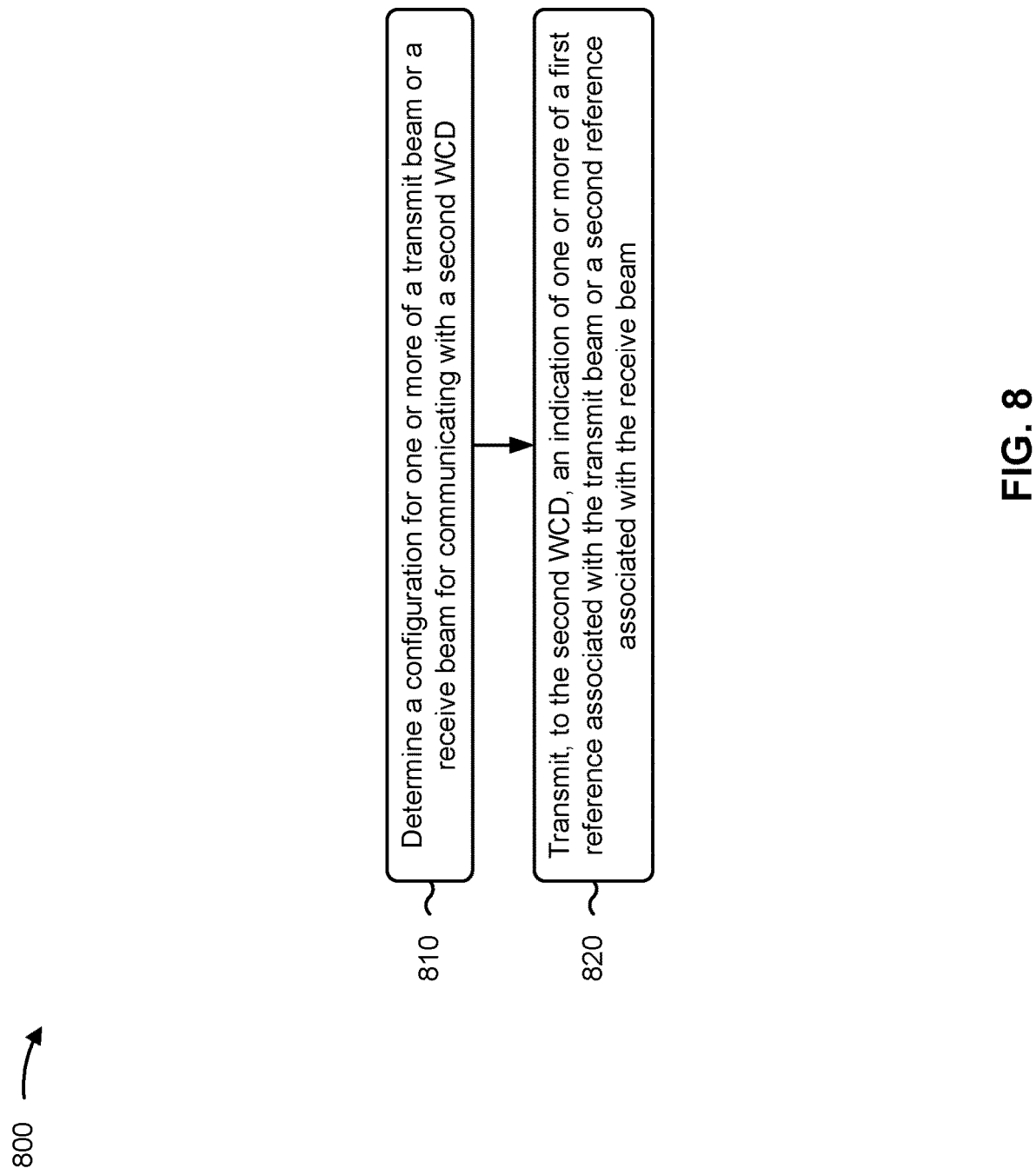

FIG. 8 is a diagram illustrating an example process 800 performed, for example, by a first WCD, in accordance with the present disclosure. Example process 800 is an example where the first WCD (e.g., UE 120, an IAB node, and/or the like) performs operations associated with indications of selected beams for transmission and reception in full duplex operation.

As shown in FIG. 8, in some aspects, process 800 may include determining a configuration for one or more of a transmit beam or a receive beam for communicating with a second WCD (block 810). For example, the first WCD (e.g., using controller/processor 280 and/or the like) may determine a configuration for one or more of a transmit beam or a receive beam for communicating with a second WCD, as described above.

As further shown in FIG. 8, in some aspects, process 800 may include transmitting, to the second WCD, an indication of one or more of a first reference associated with the transmit beam or a second reference associated with the receive beam (block 820). For example, the first WCD (e.g., using controller/processor 280, transmit processor 264, TX MIMO processor 266, MOD 254, antenna 252, and/or the like) may transmit, to the second WCD, an indication of one or more of a first reference associated with the transmit beam or a second reference associated with the receive beam, as described above.

Process 800 may include additional aspects, such as any single aspect or any combination of aspects described below and/or in connection with one or more other processes described elsewhere herein.

In a first aspect, the configuration is not fully configured by the second WCD.

In a second aspect, alone or in combination with the first aspect, transmitting the indication of one or more of the first reference or the second reference includes transmitting an indication of a transmission configuration information state that indicates a first reference signal identification associated with the receive beam and a second reference signal identification associated with the transmit beam, wherein the second reference signal identification is associated with a self-interference measurement resource identification.

In a third aspect, alone or in combination with one or more of the first and second aspects, the second reference signal identification is associated with a transmit reference signal.

In a fourth aspect, alone or in combination with one or more of the first through third aspects, transmitting the indication of one or more of the first reference or the second reference includes transmitting an indication of spatial relation information that indicates a first reference signal identification associated with the transmit beam and a second reference signal identification associated with the receive beam, wherein the second reference signal identification is associated with a self-interference measurement resource identification.

In a fifth aspect, alone or in combination with one or more of the first through fourth aspects, transmitting the indication of one or more of the first reference or the second reference includes transmitting a combined indication of a downlink TCI state that indicates a first reference signal identification and uplink spatial relation information that indicates a second reference signal identification, wherein the first reference signal identification or the second reference signal identification are associated with two self-interference measurement resource identifications.

In a sixth aspect, alone or in combination with one or more of the first through fifth aspects, transmitting the indication of one or more of the first reference or the second reference includes one or more of transmitting an indication of a transmission configuration information state that indicates a new first reference signal identification associated with the receive beam, wherein the new first reference signal identification associated with the receive beam is associated with a measurement resource identification of a reference signal resource identification, or transmitting an indication of spatial relation information that indicates a new second reference signal identification associated with the transmit beam, wherein the new second reference signal identification associated with the transmit beam is associated with a measurement resource identification of a reference signal resource identification.

In a seventh aspect, alone or in combination with one or more of the first through sixth aspects, process 800 includes receiving one or more reference signals via one or more receive beams, and transmitting one or more uplink signals via one or more transmit beams, wherein determining the configuration for one or more of the transmit beam or the receive beam includes determining the configuration for one or more of the transmit beam or the receive beam based at least in part on measurements of the one or more reference signals and the one or more uplink signals.

In an eighth aspect, alone or in combination with one or more of the first through seventh aspects, process 800 includes determining, based at least in part on the measurements of the one or more reference signals and the one or more uplink signals, SINRs associated with the one or more receive beams.

In a ninth aspect, alone or in combination with one or more of the first through eighth aspects, determining the SINRs associated with the one or more receive beams includes determining the SINRs associated with the one or more receive beams based at least in part on measuring signal strengths of the one or more reference signals transmitted by the second WCD, and measured self-interference of the one or more uplink signals transmitted by the first WCD.

In a tenth aspect, alone or in combination with one or more of the first through ninth aspects, transmitting the indication of one or more of the first reference or the second reference includes transmitting the indication of one or more of the first reference and the second reference via one or more of an UCI message, one or more medium-access-control control elements, or radio resource control signaling.

In an eleventh aspect, alone or in combination with one or more of the first through tenth aspects, one or more of the first WCD includes one or more of a user equipment or an IAB node, or the second WCD includes one or more of a base station, an IAB node, a parent node in an IAB network, a distributed unit in an IAB network, or a central unit in an IAB network.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
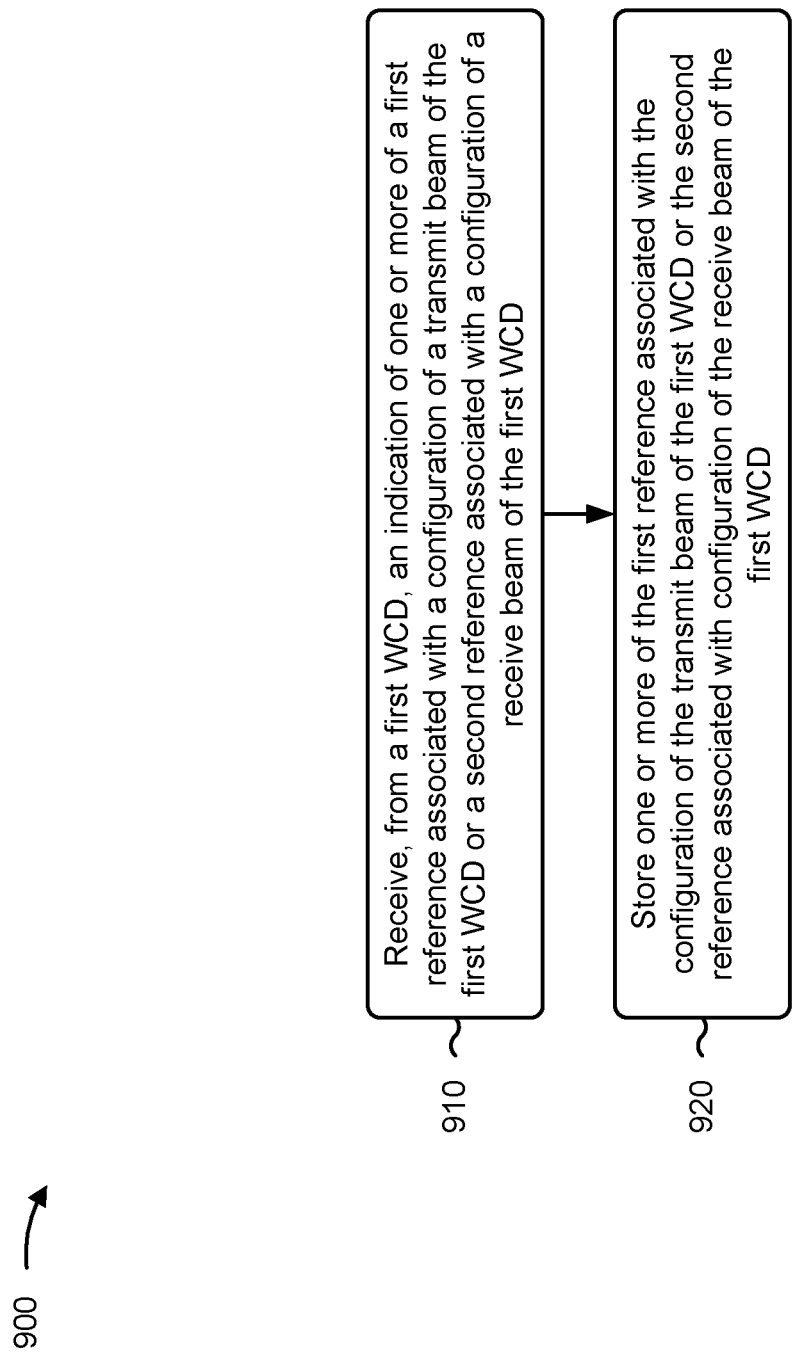

FIG. 9 is a diagram illustrating an example process 900 performed, for example, by a second WCD, in accordance with the present disclosure. Example process 900 is an example where the second WCD (e.g., base station 110, an IAB node, a parent node, a distributed unit, a central unit, and/or the like in an IAB network) performs operations associated with indications of selected beams for transmission and reception in full duplex operation.

As shown in FIG. 9, in some aspects, process 900 may include receiving, from a first WCD, an indication of one or more of a first reference associated with a configuration of a transmit beam of the first WCD or a second reference associated with a configuration of a receive beam of the first WCD (block 910). For example, the second WCD (e.g., using antenna 234, DEMOD 232, MIMO detector 236, receive processor 238, controller/processor 240, and/or the like) may receive, from a first WCD, an indication of one or more of a first reference associated with a configuration of a transmit beam of the first WCD or a second reference associated with a configuration of a receive beam of the first WCD, as described above.

As further shown in FIG. 9, in some aspects, process 900 may include storing one or more of the first reference associated with the configuration of the transmit beam of the first WCD or the second reference associated with the configuration of the receive beam of the first WCD (block 920). For example, the second WCD (e.g., using controller/processor 240 and/or the like) may store one or more of the first reference associated with the configuration of the transmit beam of the first WCD or the second reference associated with the configuration of the receive beam of the first WCD, as described above.

Process 900 may include additional aspects, such as any single aspect or any combination of aspects described below and/or in connection with one or more other processes described elsewhere herein.

In a first aspect, one or more of the configuration of the transmit beam or the configuration of the receive beam is not fully configured by the second WCD.

In a second aspect, alone or in combination with the first aspect, receiving the indication of one or more of the first reference or the second reference includes receiving an indication of a transmission configuration information state that indicates a first reference signal identification associated with the receive beam and a second reference signal identification associated with the transmit beam, wherein the second reference signal identification is associated with a self-interference measurement resource identification.

In a third aspect, alone or in combination with one or more of the first and second aspects, the second reference signal identification is associated with a transmit reference signal.

In a fourth aspect, alone or in combination with one or more of the first through third aspects, receiving the indication of one or more of the first reference or the second reference includes receiving an indication of spatial relation information that indicates a first reference signal identification associated with the transmit beam and a second reference signal identification associated with the receive beam, wherein the second reference signal identification is associated with a self-interference measurement resource identification.

In a fifth aspect, alone or in combination with one or more of the first through fourth aspects, receiving the indication of one or more of the first reference or the second reference includes receiving a combined indication of a downlink transmission configuration information state that indicates a first reference signal identification and uplink spatial relation information that indicates a second reference signal identification, wherein the second reference signal identification is associated with a self-interference measurement resource identification.

In a sixth aspect, alone or in combination with one or more of the first through fifth aspects, receiving the indication of one or more of the first reference or the second reference includes one or more of receiving an indication of a transmission configuration information state that indicates a new first reference signal identification associated with the receive beam, wherein the new first reference signal identification associated with the receive beam is associated with a measurement resource identification of a reference signal resource identification, or receiving an indication of spatial relation information that indicates a new second reference signal identification associated with the transmit beam, wherein the new second reference signal identification associated with the transmit beam is associated with a measurement resource identification of a reference signal resource identification.

In a seventh aspect, alone or in combination with one or more of the first through sixth aspects, process 900 includes transmitting one or more reference signals via a set of beams that are associated with at least the receive beam and the transmit beam, wherein the indication of one or more of the first reference or the second reference is based at least in part on measurements of the one or more reference signals.

In an eighth aspect, alone or in combination with one or more of the first through seventh aspects, the indication of one or more of the first reference or the second reference is based at least in part on SINRs associated with the one or more reference signals.

In a ninth aspect, alone or in combination with one or more of the first through eighth aspects, receiving the indication of one or more of the first reference or the second reference includes receiving the indication of one or more of the first reference and the second reference via one or more of an UCI message, one or more medium-access-control control elements, or radio resource control signaling.

In a tenth aspect, alone or in combination with one or more of the first through ninth aspects, one or more of the first WCD includes one or more of a user equipment or an IAB node, or the second WCD includes one or more of a base station, an IAB node, a parent node in an IAB network, a distributed unit in an IAB network, or a central unit in an IAB network.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a first wireless communication device (WCD), comprising: receiving, from a second WCD, transmission configuration indicator (TCI) state information that defines a set of TCI state configurations for a full duplex operation, wherein TCI state configurations of the set of TCI state configurations are associated with respective receive beams and respective transmit beams; and transmitting, to the second WCD, an indication of one or more candidate TCI states, associated with the set of TCI state configurations, for selection by the second WCD for communications using the full duplex operation.

Aspect 2: The method of Aspect 1, further comprising: receiving one or more reference signals, transmitted by the second WCD, associated with the set of TCI state configurations via the respective receive beams; transmitting one or more uplink signals associated with the set of TCI state configurations via the respective transmit beams; and determining the one or more candidate TCI states based at least in part on measurements of the one or more reference signals and the one or more uplink signals.

Aspect 3: The method of Aspect 2, further comprising: determining, based at least in part on the measurements of the one or more reference signals and the one or more uplink signals, signal to interference plus noise ratios (SINRs) associated with the one or more candidate TCI states.

Aspect 4: The method of Aspect 3, wherein determining the SINRs associated with the one or more candidate TCI states comprises: determining the SINRs associated with the one or more candidate TCI states based at least in part on: measured signal strengths of the one or more reference signals transmitted by the second WCD, and measured self-interference of the one or more uplink signals transmitted by the first WCD.

Aspect 5: The method of any of Aspects 1-4, wherein the TCI state configurations are associated with the respective receive beams and the respective transmit beams based at least in part on: the TCI state configurations indicating respective first reference signal identifications associated with the respective receive beams and respective second reference signal identifications associated with the respective transmit beams.

Aspect 6: The method of Aspect 5, wherein the respective second reference signal identifications are associated with transmit reference signals.

Aspect 7: The method of any of Aspects 1-4, wherein the TCI state configurations are associated with the respective receive beams and the respective transmit beams based at least in part on: respective single codepoints of downlink control information mapping to the respective receive beams and the respective transmit beams.

Aspect 8: The method of any of Aspects 1-7, wherein receiving the TCI state information comprises: receiving the TCI state information via one or more of: a downlink control information message, one or more medium-access-control control elements, or radio resource control signaling.

Aspect 9: The method of any of Aspects 1-8, wherein transmitting the indication of the one or more candidate TCI states comprises: transmitting the indication of the one or more candidate TCI states via one or more of: an uplink control information message, one or more medium-access-control control elements, or radio resource control signaling.

Aspect 10: The method of any of Aspects 1-9, further comprising: receiving, from the second WCD, an indication to use a candidate TCI state, of the one or more candidate TCI states, for communicating with the second WCD via a receive beam and a transmit beam using the full duplex operation.

Aspect 11: The method of any of Aspects 1-10, wherein one or more of: the first WCD comprises one or more of a user equipment or an integrated access backhaul (IAB) node, or the second WCD comprises one or more of a base station, an IAB node, a parent node in an IAB network, a distributed unit in an IAB network, or a central unit in an IAB network.

Aspect 12: A method of wireless communication performed by a second wireless communication device (WCD), comprising: transmitting, to a first WCD, transmission configuration indicator (TCI) state information that defines a set of TCI state configurations for a full duplex operation, wherein TCI state configurations of the set of TCI state configurations are associated with respective receive beams and respective transmit beams; and receiving an indication of one or more candidate TCI states, associated with the set of TCI state configurations, for selection by the second WCD for communications using the full duplex operation.

Aspect 13: The method of Aspect 12, further comprising: transmitting, for reception by the first WCD via the respective receive beams, one or more reference signals associated with the set of TCI state configurations.

Aspect 14: The method of any of Aspects 12 or 13, further comprising: selecting a candidate TCI state of the one or more candidate TCI states based at least in part on the indication of the one or more candidate TCI states.

Aspect 15: The method of any of Aspects 12-14, wherein the TCI state configurations are associated with the respective receive beams and the respective transmit beams based at least in part on: the TCI state configurations indicating respective first reference signal identifications associated with the respective receive beams and respective second reference signal identifications associated with the respective transmit beams.

Aspect 16: The method of Aspect 15, wherein the respective second reference signal identifications are associated with transmit reference signals.

Aspect 17: The method of any of Aspects 12-14, wherein the TCI state configurations are associated with the respective receive beams and the respective transmit beams based at least in part on: respective single codepoints of downlink control information mapping to the respective receive beams and the respective transmit beams.

Aspect 18: The method of any of Aspects 12-17, wherein transmitting the TCI state information comprises: transmitting the TCI state information via one or more of: a downlink control information message, one or more medium-access-control control elements, or radio resource control signaling.

Aspect 19: The method of any of Aspects 12-18, wherein receiving the indication of the one or more candidate TCI states comprises: receiving the indication of the one or more candidate TCI states via one or more of: an uplink control information message, one or more medium-access-control control elements, or radio resource control signaling.

Aspect 20: The method of any of Aspects 12-19, wherein one or more of: the first WCD comprises one or more of a user equipment or an integrated access backhaul (IAB) node, or the second WCD comprises one or more of a base station, an IAB node, a parent node in an IAB network, a distributed unit in an IAB network, or a central unit in an IAB network.

Aspect 21: A method of wireless communication performed by a first wireless communication device (WCD), comprising: determining a configuration for one or more of a transmit beam or a receive beam for communicating with a second WCD; and transmitting, to the second WCD, an indication of one or more of a first reference associated with the transmit beam or a second reference associated with the receive beam.

Aspect 22: The method of Aspect 21, wherein the configuration is not fully configured by the second WCD.

Aspect 23: The method of any of Aspects 21 or 22, wherein transmitting the indication of one or more of the first reference or the second reference comprises: transmitting an indication of a transmission configuration information state that indicates a first reference signal identification associated with the receive beam and a second reference signal identification associated with the transmit beam, wherein the second reference signal identification is associated with a self-interference measurement resource identification.

Aspect 24: The method of Aspect 23, wherein the second reference signal identification is associated with a transmit reference signal.

Aspect 25: The method of any of Aspects 21 or 22, wherein transmitting the indication of one or more of the first reference or the second reference comprises: transmitting an indication of spatial relation information that indicates a first reference signal identification associated with the transmit beam and a second reference signal identification associated with the receive beam, wherein the second reference signal identification is associated with a self-interference measurement resource identification.

Aspect 26: The method of any of Aspects 21 or 22, wherein transmitting the indication of one or more of the first reference or the second reference comprises: transmitting a combined indication of a downlink transmission configuration information state that indicates a first reference signal identification and uplink spatial relation information that indicates a second reference signal identification, wherein the first reference signal identification or the second reference signal identification are associated with two self-interference measurement resource identifications.

Aspect 27: The method of any of Aspects 21 or 22, wherein transmitting the indication of one or more of the first reference or the second reference comprises one or more of: transmitting an indication of a transmission configuration information state that indicates a new first reference signal identification associated with the receive beam, wherein the new first reference signal identification associated with the receive beam is associated with a measurement resource identification of a reference signal resource identification, or transmitting an indication of spatial relation information that indicates a new second reference signal identification associated with the transmit beam, wherein the new second reference signal identification associated with the transmit beam is associated with a measurement resource identification of a reference signal resource identification.

Aspect 28: The method of any of Aspects 21-27, further comprising: receiving one or more reference signals via one or more receive beams; and transmitting one or more uplink signals via one or more transmit beams, wherein determining the configuration for one or more of the transmit beam or the receive beam comprises: determining the configuration for one or more of the transmit beam or the receive beam based at least in part on measurements of the one or more reference signals and the one or more uplink signals.

Aspect 29: The method of Aspect 28, further comprising: determining, based at least in part on the measurements of the one or more reference signals and the one or more uplink signals, signal to interference plus noise ratios (SINRs) associated with the one or more receive beams.

Aspect 30: The method of Aspect 29, wherein determining the SINRs associated with the one or more receive beams comprises: determining the SINRs associated with the one or more receive beams based at least in part on: measured signal strengths of the one or more reference signals transmitted by the second WCD, and measured self-interference of the one or more uplink signals transmitted by the first WCD.

Aspect 31: The method of any of Aspects 21-30, wherein transmitting the indication of one or more of the first reference or the second reference comprises: transmitting the indication of one or more of the first reference and the second reference via one or more of: an uplink control information message, one or more medium-access-control control elements, or radio resource control signaling.

Aspect 32: The method of any of Aspects 21-31, wherein one or more of: the first WCD comprises one or more of a user equipment or an integrated access backhaul (IAB) node, or the second WCD comprises one or more of a base station, an IAB node, a parent node in an IAB network, a distributed unit in an IAB network, or a central unit in an IAB network.

Aspect 33: A method of wireless communication performed by a second wireless communication device (WCD), comprising: receiving, from a first WCD, an indication of one or more of a first reference associated with a configuration of a transmit beam of the first WCD or a second reference associated with a configuration of a receive beam of the first WCD; and communicating with the first WCD based at least in part on the indication of the one or more of the first reference associated with the configuration of the transmit beam of the first WCD or the second reference associated with the configuration of the receive beam of the first WCD.

Aspect 34: The method of Aspect 33, wherein one or more of the configuration of the transmit beam or the configuration of the receive beam is not fully configured by the second WCD.

Aspect 35: The method of any of Aspects 33 or 34, wherein receiving the indication of one or more of the first reference or the second reference comprises: receiving an indication of a transmission configuration information state that indicates a first reference signal identification associated with the receive beam and a second reference signal identification associated with the transmit beam, wherein the second reference signal identification is associated with a self-interference measurement resource identification.

Aspect 36: The method of Aspect 35, wherein the second reference signal identification is associated with a transmit reference signal.

Aspect 37: The method of any of Aspects 33 or 34, wherein receiving the indication of one or more of the first reference or the second reference comprises: receiving an indication of spatial relation information that indicates a first reference signal identification associated with the transmit beam and a second reference signal identification associated with the receive beam, wherein the second reference signal identification is associated with a self-interference measurement resource identification.

Aspect 38: The method of any of Aspects 33 or 34, wherein receiving the indication of one or more of the first reference or the second reference comprises: receiving a combined indication of a downlink transmission configuration information state that indicates a first reference signal identification and uplink spatial relation information that indicates a second reference signal identification, wherein the first reference signal identification or the second reference signal identification are associated with two self-interference measurement resource identifications.

Aspect 39: The method of any of Aspects 33 or 34, wherein receiving the indication of one or more of the first reference or the second reference comprises one or more of: receiving an indication of a transmission configuration information state that indicates a new first reference signal identification associated with the receive beam, wherein the new first reference signal identification associated with the receive beam is associated with a measurement resource identification of a reference signal resource identification, or receiving an indication of spatial relation information that indicates a new second reference signal identification associated with the transmit beam, wherein the new second reference signal identification associated with the transmit beam is associated with a measurement resource identification of a reference signal resource identification.

Aspect 40: The method of any of Aspects 33-39, further comprising: transmitting one or more reference signals via a set of beams that are associated with at least the receive beam and the transmit beam, wherein the indication of one or more of the first reference or the second reference is based at least in part on measurements of the one or more reference signals.

Aspect 41: The method of Aspect 40, wherein the indication of one or more of the first reference or the second reference is based at least in part on signal to interference plus noise ratios (SINRs) associated with the one or more reference signals.

Aspect 42: The method of any of Aspects 33-41, wherein receiving the indication of one or more of the first reference or the second reference comprises: receiving the indication of one or more of the first reference and the second reference via one or more of: an uplink control information message, one or more medium-access-control control elements, or radio resource control signaling.

Aspect 43: The method of any of Aspects 33-42, wherein one or more of: the first WCD comprises one or more of a user equipment or an integrated access backhaul (TAB) node, or the second WCD comprises one or more of a base station, an TAB node, a parent node in an TAB network, a distributed unit in an TAB network, or a central unit in an TAB network.

Aspect 42: An apparatus for wireless communication at a device, comprising a processor; memory coupled with the processor; and instructions stored in the memory and executable by the processor to cause the apparatus to perform the method of one or more of Aspects 1-41.

Aspect 43: A device for wireless communication, comprising a memory and one or more processors coupled to the memory, the one or more processors configured to perform the method of one or more of Aspects 1-41.

Aspect 44: An apparatus for wireless communication, comprising at least one means for performing the method of one or more of Aspects 1-41.

Aspect 45: A non-transitory computer-readable medium storing code for wireless communication, the code comprising instructions executable by a processor to perform the method of one or more of Aspects 1-41.

Aspect 46: A non-transitory computer-readable medium storing a set of instructions for wireless communication, the set of instructions comprising one or more instructions that, when executed by one or more processors of a device, cause the device to perform the method of one or more of Aspects 1-41.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device (WCD) for wireless communication, comprising:
a memory; and
one or more processors, coupled to the memory, configured to:
determine a configuration for one or more of a transmit beam or a receive beam for communicating with a second WCD; and
transmit, to the second WCD, an indication of one or more of a first reference associated with the transmit beam or a second reference associated with the receive beam, wherein the one or more processors, to transmit the indication of one or more of the first reference or the second reference, are further configured to:
   transmit an indication of a transmission configuration information state that indicates a first reference signal identification associated with the receive beam and a second reference signal identification associated with the transmit beam, wherein the second reference signal identification is associated with a self-interference measurement resource identification.

2. The first WCD of claim 1, wherein the configuration is not fully configured by the second WCD.

3. The first WCD of claim 1, wherein the second reference signal identification is associated with a transmit reference signal.

4. The first WCD of claim 1, wherein the one or more processors, to transmit the indication of one or more of the first reference or the second reference, are configured to:
   transmit an indication of spatial relation information that indicates a first reference signal identification associated with the transmit beam and a second reference signal identification associated with the receive beam, wherein the second reference signal identification is associated with a self-interference measurement resource identification.

5. A first wireless communication device (WCD) for wireless communication, comprising:
   a memory; and
   one or more processors, coupled to the memory, configured to:
      determine a configuration for one or more of a transmit beam or a receive beam for communicating with a second WCD; and
      transmit, to the second WCD, an indication of one or more of a first reference associated with the transmit beam or a second reference associated with the receive beam, wherein the one or more processors, to transmit the indication of one or more of the first reference or the second reference, are further configured to:
         transmit a combined indication of a downlink transmission configuration information state that indicates a first reference signal identification and uplink spatial relation information that indicates a second reference signal identification, wherein the first reference signal identification or the second reference signal identification are associated with two self-interference measurement resource identifications.

6. The first WCD of claim 1, wherein the one or more processors, to transmit the indication of one or more of the first reference or the second reference, are configured to:
   transmit an indication of a transmission configuration information state that indicates a new first reference signal identification associated with the receive beam, wherein the new first reference signal identification associated with the receive beam is associated with a measurement resource identification of a reference signal resource identification, or
   transmit an indication of spatial relation information that indicates a new second reference signal identification associated with the transmit beam, wherein the new second reference signal identification associated with the transmit beam is associated with a measurement resource identification of a reference signal resource identification.

7. The first WCD of claim 1, wherein one or more of:
   the first WCD comprises one or more of a user equipment or an integrated access backhaul (IAB) node, or
   the second WCD comprises one or more of a base station, an IAB node, a parent node in an IAB network, a distributed unit in an IAB network, or a central unit in an IAB network.

8. The first WCD of claim 1, wherein transmitting the indication of one or more of the first reference or the second reference comprises:
   transmitting the indication of one or more of the first reference and the second reference via one or more of:
      an uplink control information message,
      one or more medium-access-control control elements, or
      radio resource control signaling.

9. A second wireless communication device (WCD) for wireless communication, comprising:
   a memory; and
   one or more processors, coupled to the memory, configured to:
      receive, from a first WCD, an indication of one or more of a first reference associated with a configuration of a transmit beam of the first WCD or a second reference associated with a configuration of a receive beam of the first WCD, wherein receiving the indication further comprises receiving an indication of a transmission configuration information state that indicates a first reference signal identification associated with the receive beam and a second reference signal identification associated with the transmit beam, wherein the second reference signal identification is associated with a self-interference measurement resource identification; and
      communicate with the first WCD based at least in part on the indication of the one or more of the first reference associated with the configuration of the transmit beam of the first WCD or the second reference associated with the configuration of the receive beam of the first WCD.

10. The second WCD of claim 9, wherein one or more of the configuration of the transmit beam or the configuration of the receive beam is not fully configured by the second WCD.

11. The second WCD of claim 9, wherein the one or more processors are further configured to:
   transmit one or more reference signals via a set of beams that are associated with at least the receive beam and the transmit beam,
      wherein the indication of one or more of the first reference or the second reference is based at least in part on signal to interference plus noise ratios (SINRs) associated with the one or more reference signals.

12. The second WCD of claim 9, wherein one or more of:
   the first WCD comprises one or more of a user equipment or an integrated access backhaul (IAB) node, or
   the second WCD comprises one or more of a base station, an TAB node, a parent node in an TAB network, a distributed unit in an TAB network, or a central unit in an TAB network.

13. A method of wireless communication performed by a wireless communication device (WCD) comprising:
   determining a configuration for one or more of a transmit beam or a receive beam for communicating with a second WCD; and transmitting, to the second WCD, an indication of one or more of a first reference associated with the transmit beam or a second reference associated with the receive beam, wherein the transmitting further comprises transmitting an indication of a transmission configuration information state that indicates a first reference signal identification associated with the receive beam and a second reference signal identification associated with the transmit beam, wherein the second reference signal identification is associated with a self-interference measurement resource identification.

14. The method of claim 13, wherein the configuration is not fully configured by the second WCD.

15. The method of claim 13, wherein the second reference signal identification is associated with a transmit reference signal.

\* \* \* \* \*